US012786634B2

(12) United States Patent
Huang et al.

(10) Patent No.: US 12,786,634 B2
(45) Date of Patent: Nov. 3, 2026

(54) CROSSTALK ELIMINATION PLAYBACK SYSTEM AND METHOD THEREOF

(71) Applicant: Lanto Electronic Limited, Kunshan City (CN)

(72) Inventors: Che-Yung Huang, Taipei City (TW); Kun-Ting Tsai, Taipei City (TW); Chi-Liang Chen, Taipei City (TW); Hsin-Nan Chen, Taipei City (TW)

(73) Assignee: LANTO ELECTRONIC LIMITED, Kunshan City (CN)

( * ) Notice: Subject to any disclaimer, the term of this patent is extended or adjusted under 35 U.S.C. 154(b) by 164 days.

(21) Appl. No.: 18/744,821

(22) Filed: Jun. 17, 2024

(65) Prior Publication Data

US 2025/0088802 A1 Mar. 13, 2025

(30) Foreign Application Priority Data

Sep. 11, 2023 (CN) ......................... 202311163353.9

(51) Int. Cl.

*H04R 5/04* (2006.01)
*H04R 3/04* (2006.01)

(52) U.S. Cl.

CPC ................. *H04R 5/04* (2013.01); *H04R 3/04* (2013.01); *H04R 2430/01* (2013.01)

(58) Field of Classification Search

CPC .................................... H04R 5/04; H04R 3/04
See application file for complete search history.

(56) References Cited

U.S. PATENT DOCUMENTS 6,009,178 A * 12/1999 Abel ........................ H04R 5/04 381/1
8,068,406 B2 * 11/2011 Kim ......................... H04B 3/23 370/201
8,831,230 B2 * 9/2014 Llewellyn ........... H03F 3/45475 381/1
9,479,870 B2 * 10/2016 Stamatopoulos ........ H04R 3/12
9,544,688 B1 * 1/2017 Knoblock ............ H04R 1/1066
9,549,248 B2 * 1/2017 Holzmann ............... H04R 3/00
(Continued)

FOREIGN PATENT DOCUMENTS

CN 104427441 A 3/2015
CN 108260040 B 7/2020
(Continued)

*Primary Examiner* — Olisa Anwah
(74) *Attorney, Agent, or Firm* — Birch, Stewart, Kolasch & Birch, LLP

(57) ABSTRACT

The present application discloses a crosstalk elimination method and a playback system for crosstalk elimination. The method includes steps: inputting a first test signal into a signal processor via an audio source input cable; detecting a first crosstalk signal generated by a second speaker and caused by a first test signal when the signal processor transmitting the first test signal to the first speaker; reversing the detected first crosstalk signal to a first reversed signal having equal volume and opposite phase, wherein when the signal processor transmits the first test signal to the first speaker again, the second speaker receives the first crosstalk signal and emits a first crosstalk sound, the first reversed signal is transmitted to the second speaker to emit a first reversed phase sound, and the first reversed phase sound eliminates the first crosstalk sound.

15 Claims, 11 Drawing Sheets

(56) References Cited

U.S. PATENT DOCUMENTS

| | | | | |
|---|---|---|---|---|
| 10,735,861 | B2 * | 8/2020 | Butten | H04R 1/406 |
| 2003/0121403 | A1 * | 7/2003 | Miyagishima | G10H 1/0091<br>84/735 |
| 2009/0052678 | A1 * | 2/2009 | Cheng | H04R 29/001<br>381/58 |
| 2014/0376753 | A1 * | 12/2014 | Nystrom | H04R 5/04<br>381/309 |
| 2023/0319488 | A1 * | 10/2023 | Corey | H04R 3/005<br>381/318 |

FOREIGN PATENT DOCUMENTS

| | | | |
|---|---|---|---|
| CN | 110858935 | B | 5/2021 |
| CN | 113453115 | A | 9/2021 |
| TW | 201824880 | A | 7/2018 |
| TW | 202239220 | A | 10/2022 |

* cited by examiner

CROSSTALK ELIMINATION PLAYBACK SYSTEM AND METHOD THEREOF

CROSS REFERENCE TO RELATED APPLICATION

The present application claims the priority benefit of Chinese Patent Application Serial Number 202311163353.9, filed on Sep. 11, 2023, the full disclosure of which is incorporated herein by reference.

BACKGROUND

Technical Field

The present application is related to the technical field regarding crosstalk elimination, especially to a crosstalk elimination method and a crosstalk elimination playback system.

Related Art

Currently, wired playback devices commonly face issues of crosstalk interference. One of the reasons for this is that the wires of the first speaker and the second speaker in the wired playback device are connected in parallel, causing the audio signal from the first speaker to induce an incorrect current transmission to the second speaker, leading to interference with the audio signal of the second speaker when the first speaker is playing audio. Similarly, the audio signal from the second speaker induces an incorrect current transmission to the first speaker, causing interference with the audio signal of the first speaker when the second speaker is playing audio.

On the other hand, another reason is that the circuit board design of the wired playback device has a common impedance that is excessively high. The current circuit passes through this common impedance back to the amplifier, creating unnecessary voltage between the first speaker and the second speaker. This results in the first speaker playing the signal of the second speaker simultaneously when playing audio, and similarly, the second speaker playing the signal of the first speaker when playing audio. As a result, users perceive a lack of stereo separation in the audio.

Therefore, there is an urgent need to design a crosstalk elimination method and a crosstalk elimination playback system to address the issue of crosstalk interference in wired playback devices.

SUMMARY

The embodiments of the present application provide a crosstalk elimination method and a crosstalk elimination playback system to address the issue of crosstalk interference between the first speaker and the second speaker in wired playback system.

To address the aforementioned technical issues, the present application is implemented as follows: In one aspect, a crosstalk elimination method for a playback system is provided. The playback system includes an audio source input cable, a signal processor, a first speaker and a second speaker. The audio source input cable is connected to the signal processor. The signal processor is respectively connected to the first speaker and the second speaker. The crosstalk elimination method includes steps of: inputting a first test signal into the signal processor via the audio source input cable; detecting a first crosstalk signal generated by the second speaker and caused by the first test signal when the signal processor transmitting the first test signal to the first speaker; reversing the detected first crosstalk signal to a first reversed signal having equal volume and opposite phase, wherein when the signal processor transmits the first test signal to the first speaker again, the second speaker receives the first crosstalk signal and emits a first crosstalk sound, the first reversed signal is transmitted to the second speaker to emit a first reversed phase sound, and the first reversed phase sound eliminates the first crosstalk sound.

In some embodiments, the steps of: inputting a second test signal into the signal processor via the audio source input cable; detecting a second crosstalk signal generated by the first speaker and caused by the second test signal when the signal processor transmitting the second test signal to the second speaker; reversing the detected second crosstalk signal to a second reversed signal having equal volume and opposite phase, are further included, wherein when the signal processor transmits the second test signal to the second speaker again, the first speaker receives the second crosstalk signal and emits a second crosstalk sound, the second reversed signal is transmitted to the first speaker to emit a second reversed phase sound, and the second reversed phase sound eliminates the second crosstalk sound.

In some embodiments, in the steps of detecting the first crosstalk signal generated by the second speaker and caused by the first test signal and detecting the second crosstalk signal generated by the first speaker and caused by the second test signal, the following steps are further included: using a detection device electrically connected to the second speaker, wherein the detection device detects the first crosstalk signal, and the first crosstalk signal is stored in the signal processor; and using the detection device electrically connected to the first speaker, wherein the detection device detects the second crosstalk signal, and the second crosstalk signal is stored in the signal processor.

In some embodiments, in the steps of detecting the first crosstalk signal generated by the second speaker and caused by the first test signal and detecting the second crosstalk signal generated by the first speaker and caused by the second test signal, the following steps are further included: using a first sound receiver of a detection device corresponding to the second speaker for receiving the first crosstalk sound, wherein the first crosstalk sound is converted to the first crosstalk signal, and the first crosstalk signal is stored in the signal processor; using a second sound receiver of the detection device corresponding to the first speaker for receiving the second crosstalk sound, wherein the second crosstalk sound is converted to the second crosstalk signal, and the second crosstalk signal is stored in the signal processor.

In some embodiments, in the steps of detecting the first crosstalk signal generated by the second speaker and caused by the first test signal and detecting the second crosstalk signal generated by the first speaker and caused by the second test signal, the second speaker is electrically connected to the signal processor via a second signal feedback line, the signal processor detects the first crosstalk signal, the first speaker is electrically connected to the signal processor via a first signal feedback line, and the signal processor detects the second crosstalk signal.

In some embodiments, in the steps of detecting the first crosstalk signal generated by the second speaker and caused by the first test signal and detecting the second crosstalk signal generated by the first speaker and caused by the second test signal, the following steps are further included: using a first sound receiver corresponding to the second speaker, wherein the first sound receiver receives the first crosstalk sound, converts the first crosstalk sound to the first crosstalk signal, and transmits the first crosstalk signal to the signal processor; and using a second sound receiver corresponding to the first speaker, wherein the second sound receiver receives the second crosstalk sound, converts the second crosstalk sound to the second crosstalk signal, and transmits the second crosstalk signal to the signal processor.

In some embodiments, the following steps are further included: storing the first crosstalk signal in the signal processor, wherein the first crosstalk signal is caused by the first test signal with a plurality of frequency bands; and storing the second crosstalk signal in the signal processor, wherein the second crosstalk signal is caused by the second test signal with a plurality of frequency bands; when the signal processor transmitting an audio signal input to the first speaker and the second speaker via the audio source input cable, the signal processor selecting the first crosstalk signal and the second crosstalk signal corresponding to the frequency band of the audio signal; reversing the selected first crosstalk signal to the first reversed signal having equal volume and opposite phase; transmitting the first reversed signal to the second speaker to emit the first reversed phase sound for eliminating a first crosstalk sound caused by the audio signal in the second speaker; and transmitting the second reversed signal to the first speaker to emit the second reversed phase sound for eliminating a second crosstalk sound caused by the audio signal in the second speaker.

In the embodiments of the present application, under the condition that the first speaker plays the first test signal, the first crosstalk signal generated by the second speaker resulting from the first test signal is detected. When the first speaker plays the first test signal again, the second speaker plays the first reversed signal, which is equal in volume and opposite in phase to the first crosstalk signal. Through the first reversed phase sound emitted by the second speaker eliminating the first crosstalk sound, the interference problem caused by the first crosstalk sound generated by the second speaker resulting from the first test signal output from the first speaker can be reduced. Therefore, the second speaker output the audio with low signal interference to improve the effect of stereo sound.

In the second aspect, a crosstalk elimination playback system is provided. The crosstalk elimination playback system includes an audio source input cable, a signal processor, a first speaker and a second speaker. The audio source input cable has two terminals in which one is used for inputting an audio signal. The signal processor is electrically connected to the other terminal of the audio source input cable. The signal processor stores a first crosstalk signal and a second crosstalk signal with a plurality of frequency bands. The first speaker is electrically connected to the signal processor, and the second speaker is electrically connected to the signal processor. When the first speaker and the second speaker output the audio signal, a first crosstalk sound and a second crosstalk sound are respectively generated which are caused by the audio signal in the second speaker and the first speaker, the signal processor selects the first crosstalk signal and the second crosstalk signal corresponding to the frequency band of the first crosstalk sound and the second crosstalk sound, the first crosstalk signal and the second crosstalk signal are reversed to a first reversed signal and a second reversed signal both having equal volume and opposite phase respectively, the second speaker outputs the first reversed signal to a first reversed phase sound for eliminating the first crosstalk sound, and the first speaker outputs the second reversed signal to a second reversed phase sound for eliminating the second crosstalk sound.

In some embodiments, the detection device is further included. The first speaker outputs a first test signal, the detection device detects the first crosstalk signal emitted by the second speaker, the first crosstalk signal is stored in the signal processor, the second speaker outputs a second test signal, the detection device detects the second crosstalk signal emitted by the first speaker, and the second crosstalk signal is stored in the signal processor.

In some embodiments, the detection device is further included. A detection device includes a first sound receiver and a second sound receiver. The first speaker outputs a first test signal, the first sound receiver corresponds to the second speaker, the first sound receiver receives the first crosstalk sound of the second speaker, the first sound receiver converts the first crosstalk sound to the first crosstalk signal, the second speaker outputs a second test signal, the second sound receiver corresponds to the first speaker, the second sound receiver receives the second crosstalk sound of the first speaker, and the second sound receiver converts the second crosstalk sound to the second crosstalk signal.

In some embodiments, the signal processor includes a storage module and an inversion module connected to the storage module, the storage module stores the first and the second crosstalk signals, the inversion module reverses the first crosstalk signal to the first reversed signal, and the inversion module reverses the second crosstalk signal to the second reversed signal.

In the embodiments of the present application, through the first crosstalk signal and the second crosstalk signal of a plurality of frequency bands stored in the signal processor, the signal processor selects corresponding the first crosstalk signal and the second crosstalk signal according to the frequency bands of the audio signal. When the first speaker and the second speaker output the audio signal, the second speaker simultaneously output the first reversed signal having equal volume and opposite phase to the first crosstalk signal, and the first speaker simultaneously output the second reversed signal having equal volume and opposite phase to the second crosstalk signal. This reduces mutual interference between the first speaker and the second speaker due to the output of audio signals, so that the first speaker and the second speaker output the audio with low signal interference to improve the effect of stereo sound.

In the third aspect, a crosstalk elimination playback system is provided. The crosstalk elimination playback system includes an audio source input cable, a signal processor, a first speaker and a second speaker. The audio source input cable has two terminals in which one is used for inputting an audio signal. The signal processor is electrically connected to the other terminal of the audio source input cable. The first speaker is electrically connected to the signal processor, and the second speaker is electrically connected to the signal processor. When the first speaker and the second speaker output the audio signal, and the audio signal causes the second speaker to generate the first crosstalk sound signal and the first speaker to generate the second crosstalk sound signal, the first crosstalk sound signal is output to the first crosstalk sound via the second speaker, the second crosstalk sound signal is output to the second crosstalk sound via the first speaker, the signal processor detects the first and second speakers respectively, the signal processor reverses the first crosstalk sound signal to a first audio reversed signal having equal volume and opposite phase, the second speaker outputs the first audio reversed signal to a first audio reversed phase sound, the first audio reversed phase sound eliminates the first crosstalk sound, the signal processor reverses the second crosstalk sound signal to a second audio reversed signal having equal volume and opposite phase, the first speaker outputs the second audio reversed signal to a second audio reversed phase sound, and the second audio reversed phase sound eliminates the second crosstalk sound.

In some embodiments, the processor includes a first signal feedback line and a second signal feedback line, the first signal feedback line is electrically connected to the first speaker, the first signal feedback line receives the second crosstalk sound signal from the first speaker, the second signal feedback line is electrically connected to the second speaker, and the second signal feedback line receives the first crosstalk sound signal from the second speaker.

In some embodiments, the signal processor includes a first sound receiver and a second sound receiver, the first sound receiver is corresponding to the second speaker, the first sound receiver receives the first crosstalk sound from the second speaker, the first sound receiver converts the first crosstalk sound to the first crosstalk sound signal, the second sound receiver is corresponding to the first speaker, the second sound receiver receives the second crosstalk sound from the first speaker, and the second sound receiver converts the second crosstalk sound to the second crosstalk sound signal.

In the embodiments of the present application, by utilizing a feedback mechanism through the signal processor, the first crosstalk sound signal and the second crosstalk sound signal generated by the first speaker and the second speaker when playing audio signals are separately detected. When the first speaker and the second speaker output audio signals, the second speaker simultaneously outputs the first audio inverted signal, which has the same volume and opposite phase as the first crosstalk sound signal, and the first speaker simultaneously outputs the second audio inverted signal, which has the same volume and opposite phase as the second crosstalk sound signal. This not only reduces crosstalk interference between the first and second speakers, resulting in the first and second speakers outputting audio with low signal interference and enhancing the stereo sound effect of the playback system but also allows the playback device to self-correct crosstalk, preventing degradation in stereo sound due to system aging and maintaining the effectiveness of crosstalk elimination.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

Figure 1:
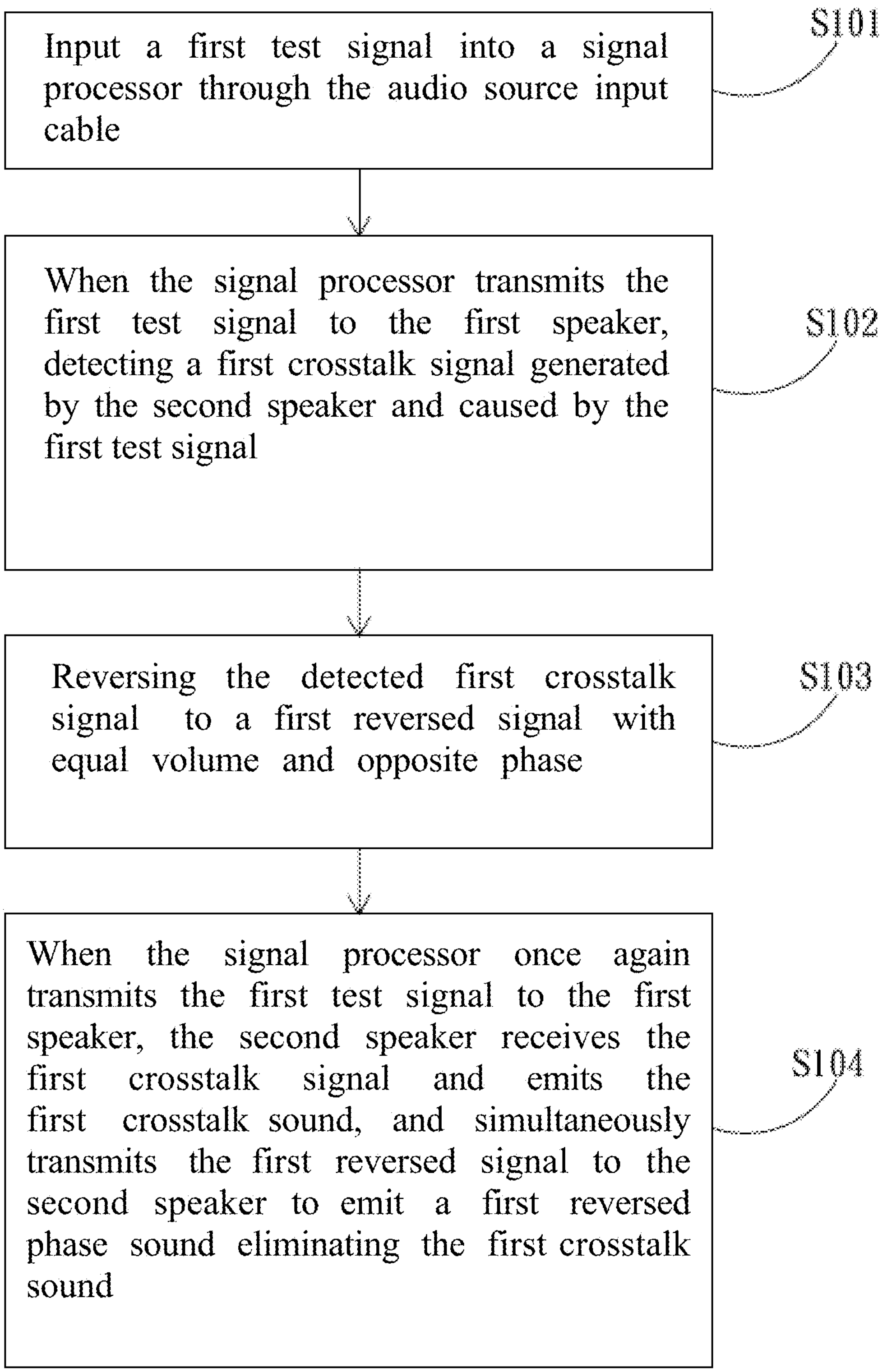
FIG. 1 is the step-by-step flowchart of the crosstalk elimination method of the present application.

Considering the accompanying diagrams, the explanations are as follows: 100: playback system; 1: audio source input cable; 11: audio plug; 2: signal processor; 21: storage module; 22: inversion module; 201: first sound receiver; 202: second sound receiver; 3: first speaker; 31: first audio source input cable; 4: second speaker; 41: second audio source input cable; 5: detection device; 51: first input terminal; 52: second input terminal; 53: output terminal; 501: first sound receiver; 502: second sound receiver; 6: second signal feedback line; 7: first signal feedback line; A1: first test signal; A2: second test signal; B1: first crosstalk signal; B11: first inverted signal; B2: second crosstalk signal; B21: second reversed signal; C: audio signal; C1: first crosstalk sound signal; C11: first audio inverted signal; C2: second crosstalk sound signal; C21: second audio inverted signal.

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

In the following embodiment, the same reference numerals are used to refer to the same or similar elements throughout the invention.

Figure 2:
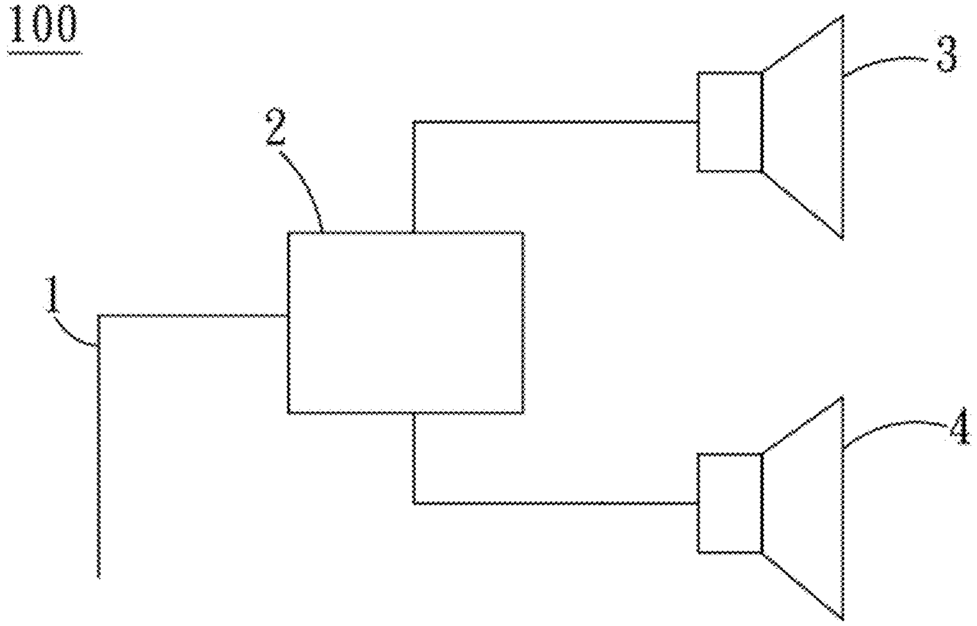
FIG. 2 is a schematic diagram of the playback system of the present application.

Please refer to FIG. 1 and FIG. 2, where FIG. 1 is the step-by-step flowchart of the crosstalk elimination method in the present application, and FIG. 2 is a schematic diagram of the playback system. As shown in the figures, the crosstalk elimination method in this embodiment is designed to eliminate crosstalk in the playback system 100, which can be in the form of headphones, in-car headphones, earbuds, hearing aids, or assistive listening devices, among others. The crosstalk elimination method includes steps S101 to S104. In this embodiment, the playback system 100 includes an audio source input cable 1, a signal processor 2, a first speaker 3, and a second speaker 4. The audio source input cable 1 is connected to the signal processor 2. The signal processor 2 is connected to the first speaker 3 and the second speaker 4, respectively. The audio source input cable 1 inputs signals to the first speaker 3 and the second speaker 4 through the signal processor 2. The signal processor 2 is a digital signal processor (DSP), and the first speaker 3 and the second speaker 4 can be speakers or amplifiers used to output signal and generate audio.

Figure 3:
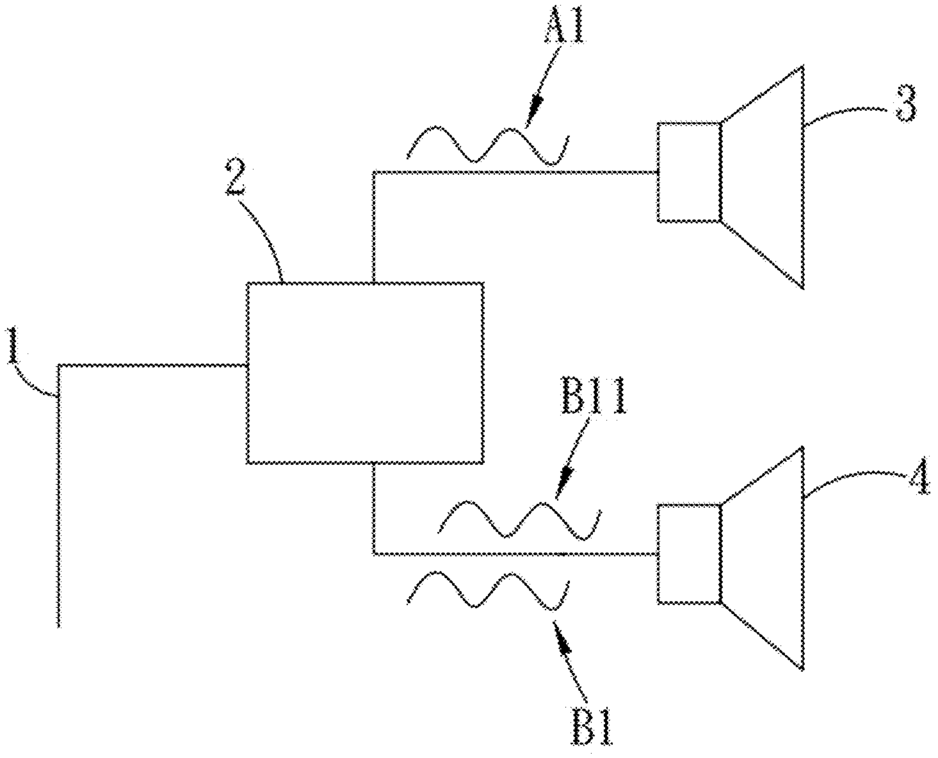
FIG. 3 is a schematic diagram of eliminating the first crosstalk sound in the present application.

Please also refer to FIG. 3, which is a schematic diagram of eliminating the first crosstalk sound in the present application. As shown in the figure, in this embodiment of the crosstalk elimination method, when eliminating crosstalk in the playback system 100, it begins by executing step S101 in which the first test signal A1 is input into the signal processor 2 through the audio source input cable 1. Subsequently, step S102 is performed. When the signal processor 2 transmits the first test signal A1 to the first speaker 3, the first test signal A1 results in the first crosstalk signal B1 generated by the speaker 4. Next, step S103 is executed. The detected first crosstalk signal B1 is processed in reverse phase to the first reversed signal B11 with equal volume and opposite phase. Finally, step S104 is carried out. Under the condition that the signal processor 2 once again transmits the first test signal A1 to the first speaker 3, the second speaker 4 receives the first crosstalk signal B1 and emits the first crosstalk sound, simultaneously transmits the first reversed signal B11 to the second speaker 4 to emit a first reversed phase sound eliminating the first crosstalk sound. This process effectively reduces the interference caused by the first speaker 3 outputting the first test signal A1, resulting in the generation of the first crosstalk sound in the second speaker 4, and enables the second speaker 4 to output an audio with low signal interference, thereby enhancing the stereo sound effect.

Figure 4:
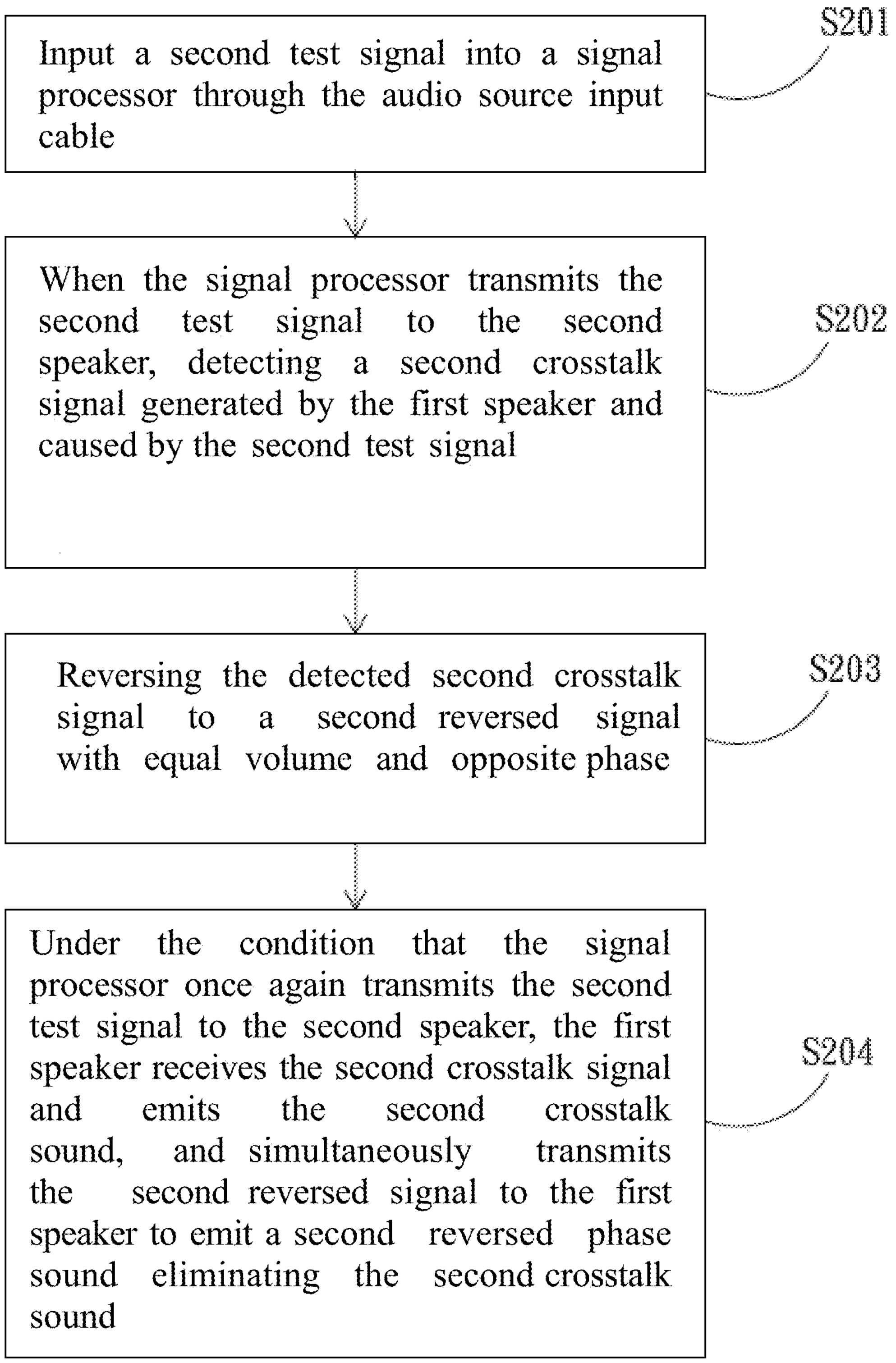
FIG. 4 is another step-by-step flowchart of the crosstalk elimination method of the present application.
Figure 5:
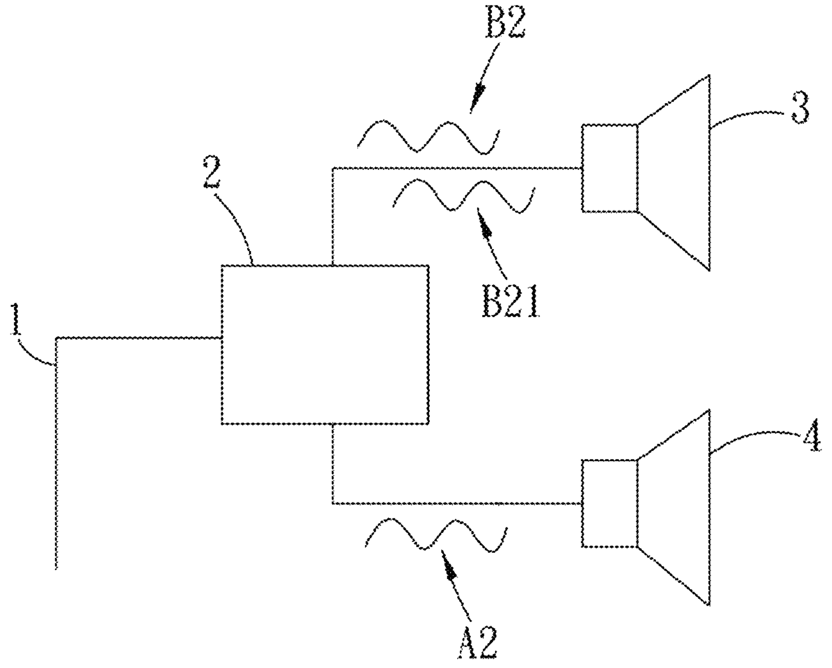
FIG. 5 is a schematic diagram of eliminating the second crosstalk sound in the present application.

Please refer to FIG. 4 and FIG. 5. FIG. 4 is another step flowchart of the crosstalk elimination method in the present application, and FIG. 5 is a schematic diagram of eliminating the second crosstalk sound. As shown in the figures, this embodiment of the crosstalk elimination method also includes the following steps, from S201 to S204. It begins with step S201, where the second test signal A2 is input into the signal processor 2 through the audio source input cable 1. Next, step S202 is performed. In this step, the detection is done when the signal processor 2 transmits the second test signal A2 to the second speaker 4, and the second test signal A2 causes the first speaker 3 to generate the second crosstalk signal B2. Then, step S203 is executed. In this step, the detected second crosstalk signal B2 is processed in reverse phase to the second reversed signal B21 with equal volume and opposite phase. Finally, step S204 is carried out. In this step, the signal processor 2 again transmits the second test signal A2 to the second speaker 4, and the first speaker 3 receives the second crosstalk signal B2 and emits the second crosstalk sound while simultaneously transmitting the second reversed signal B21 to the first speaker 3 to emit the second reversed phase sound, thereby eliminating the second crosstalk sound. This process effectively reduces the interference caused by the second speaker 4 outputting the second test signal A2, resulting in the generation of the second crosstalk sound in the first speaker 3, and enables the first speaker 3 to output the audio with low signal interference, thereby enhancing the stereo sound effect.

Figure 6:
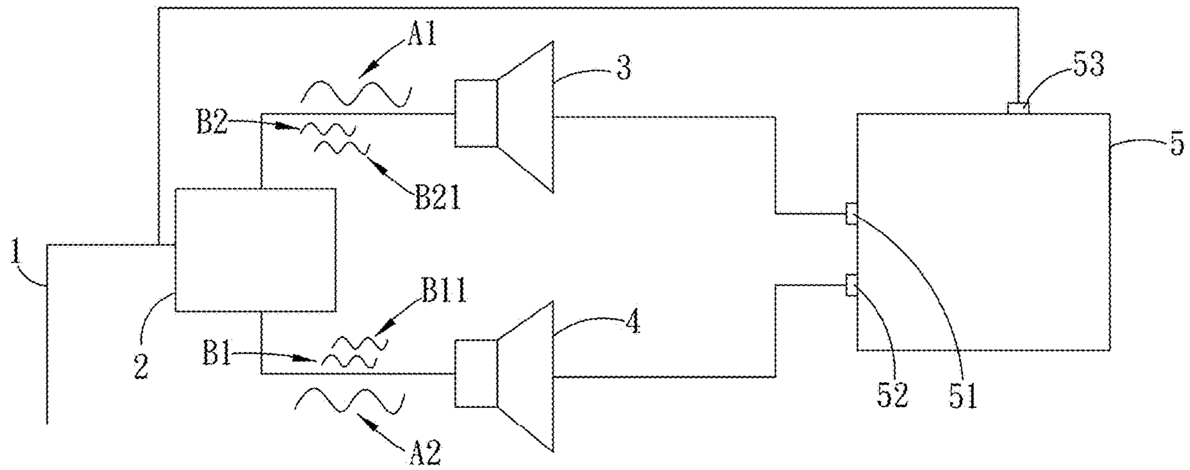
FIG. 6 is a schematic diagram of the crosstalk elimination playback system for the first embodiment of the present application.

Please refer to FIG. 6 and once again FIG. 3 and FIG. 5, where FIG. 6 is a schematic diagram of the crosstalk elimination playback system of the first embodiment of the present application. As shown in the figures, in the present embodiment, the detection device 5 is electrically connected to the second speaker 4, the detection device 5 detects the first crosstalk signal B1 and stores the first crosstalk signal B1 in the signal processor 2. The detection device 5 is electrically connected to the first speaker 3, the detection device 5 detects the second crosstalk signal B2 and stores the second crosstalk signal B2 in the signal processor 2, wherein the detection device 5 can use a frequency spectrum analyzer. The first input terminal 51 of the detection device 5 is electrically connected to the first speaker 3. The second input terminal 52 of the detection device 5 is electrically connected to the second speaker 4. The output terminal 53 of the detection device 5 is electrically connected to the audio source input cable 1. The output terminal 53 of the detection device 5 can provide the first test signal A1 and/or the second test signal A2 for detection for the playback system 100.

When the crosstalk elimination playback system 100 of the present embodiment executes the step S101 and the step S201, via the output terminal 53 and the audio source input cable 1, the detection device 5 inputs the first test signal A1 and the second test signal A2 enters the signal processor 2. When the step S102 and the step S202 are executed, under the condition that the signal processor 2 transmits the first test signal A1 to the first speaker 3, the first test signal A1 results in the first crosstalk signal B1 generated by the second speaker 4. The detection device 5 detects the first crosstalk signal B1 generated by the second speaker 4 via the second input terminal 52. Under the condition that the signal processor 2 transmits the second test signal A2 to the second speaker 4, the second test signal A2 results in the second crosstalk signal B2 generated by the first speaker 3. The detection device 5 detects the second crosstalk signal B2 generated by the first speaker 3 via the first input terminal 51, and then the detected first crosstalk signal B1 and second crosstalk signal B2 are stored in the memory of the signal processor 2.

As the abovementioned, when the step S103 and the step S203 are executed, the signal processor 2 processes the detected first crosstalk signal B1 in reverse phase to the first reversed signal B11 with equal volume and opposite phase, and processes the detected second crosstalk signal B2 in reverse phase to the second reversed signal B21 with equal volume and opposite phase. When the step S104 and the step S204 are executed, the detection device 5 inputs the first test signal A1 via the output terminal 53 and the audio source input cable 1 again, and the second test signal A2 enters the signal processor 2. The signal processor 2 transmits the first test signal A1 to the first speaker 3 and the second test signal A2 to the second speaker 4 again. The signal processor 2 simultaneously transmits the first reversed signal B11 to the second speaker 4 and the second reversed signal B21 to the first speaker 3, causing the second speaker 4 to receive the first crosstalk signal B1 and the first reversed signal B11 at the same time, and the first speaker 3 to receive the second crosstalk signal B2 and the second reversed signal B21 at the same time. The second speaker 4 simultaneously emits the first crosstalk sound and the first reversed phase sound, and the first speaker 3 simultaneously emits the second crosstalk sound and the second reversed phase sound. The first reversed phase sound eliminates the first crosstalk sound, and the second reversed phase sound eliminates the second crosstalk sound.

The crosstalk elimination playback system 100 of this embodiment of crosstalk elimination utilizes the characteristic that the first crosstalk signal B1 and the second crosstalk signal B2 are easily measurable, the detection device 5 inputs the first test signal A1 and the second test signal A2 to the first speaker 3 and the second speaker 4 respectively. The measured first crosstalk signal B1 and second crosstalk signal B2 are stored as reference signals in the signal processor 2. The signal processor 2 processes the first crosstalk signal B1 and the second crosstalk signal B2 in reverse phase to the first reversed signal B11 and the second reversed signal B21 both with equal volume and opposite phase, and the first reversed signal B11 and the second reversed signal B21 are used as reference signals for elimination. The first speaker 3 outputs the first test signal A1 and transmits the first reversed signal B11 to the second speaker 4 simultaneously, and the second speaker 4 outputs the second test signal A2 and transmits the second reversed signal B21 to the first speaker 3 simultaneously so that the crosstalk interference problem between the first speaker 3 and the second speaker 4 can be reduced, and thereby the first speaker 3 and the second speaker 4 output the audio with low signal interference to improve the effect of the stereo sound.

Figure 7:
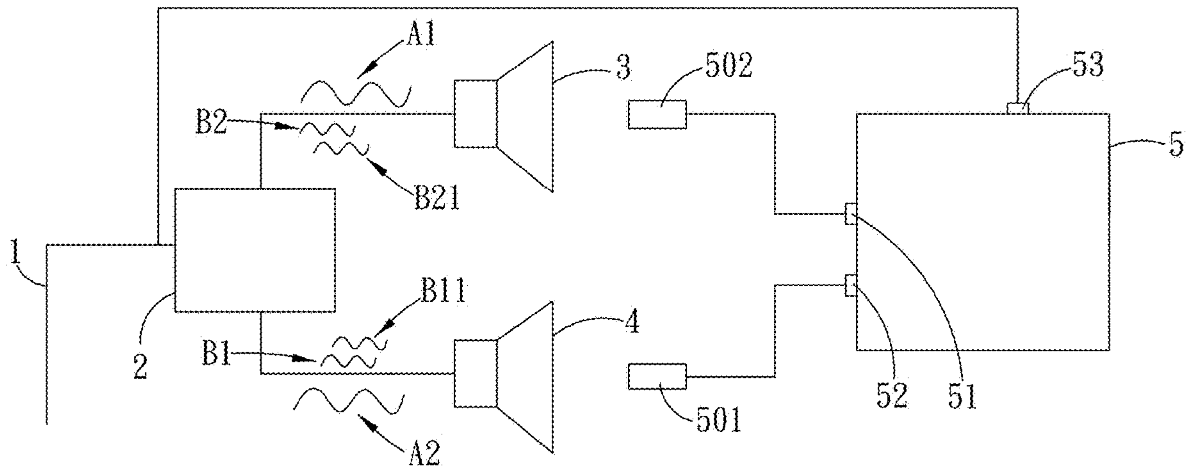
FIG. 7 is a schematic diagram of the crosstalk elimination playback system for the second embodiment of the present application.

Please refer to FIG. 7 and refer FIG. 3 and FIG. 5 again, where FIG. 7 is a schematic diagram of the crosstalk elimination playback system for the second embodiment of the present application. As shown in the figure, in this embodiment, the first sound receiver 501 of the detection device 5 corresponds to the second speaker 4, the first sound receiver 501 receives the first crosstalk sound and converts the first crosstalk sound to the first crosstalk signal B1, and stores the first crosstalk signal B1 in the signal processor 2. The second sound receiver 502 of the detection device 5 corresponds to the first speaker 3, the second sound receiver 502 receives the second crosstalk sound and converts the second crosstalk sound to the second crosstalk signal B2, and stores the second crosstalk signal B2 in the signal processor 2. The detection device 5 can use a frequency spectrum analyzer. The first sound receiver 501 uses a first microphone, and the second sound receiver 502 uses a second microphone. The second input terminal 52 of the detection device 5 is electrically connected to the first sound receiver 501 corresponding to the second speaker 4. The first input terminal 51 of the detection device 5 is electrically connected to the second sound receiver 502 corresponding to the first speaker 3. The output terminal 53 of the detection device 5 is electrically connected to the audio source input cable 1, and the output terminal 53 of the detection device 5 can provide the first test signal A1 or/and the second test signal A2 for detection for the playback system 100.

When the crosstalk elimination playback system 100 of the present embodiment executes the step S101 and the step S201, via the output terminal 53 and the audio source input cable 1, the detection device 5 inputs the first test signal A1 and the second test signal A2 enters the signal processor 2. When the step S102 and the step S202 are executed, under the condition that the signal processor 2 transmits the first test signal A1 to the first speaker 3, the first test signal A1 results in the first crosstalk signal B1 generated by the second speaker 4. The detection device 5 receives the first crosstalk sound generated by the second speaker 4 via the first sound receiver 501, and converts the first crosstalk sound to the first crosstalk signal B1 Under the condition that the signal processor 2 transmits the second test signal A2 to the second speaker 4, the second test signal A2 results in the second crosstalk signal B2 generated by the first speaker 3. The detection device 5 receives the second crosstalk sound generated by the first speaker 3 via the second sound receiver 502, and converts the second crosstalk sound to the second crosstalk signal B2. Then the detected first crosstalk signal B1 and second crosstalk signal B2 are stored in the memory of the signal processor 2.

As the abovementioned, when the step S103 and the step S203 are executed, the signal processor 2 processes the detected first crosstalk signal B1 in reverse phase to the first reversed signal B11 with equal volume and opposite phase, and processes the detected second crosstalk signal B2 in reverse phase to the second reversed signal B21 with equal volume and opposite phase. When the step S104 and the step S204 are executed, the detection device 5 inputs the first test signal A1 via the output terminal 53 and the audio source input cable 1 again, and the second test signal A2 enters the signal processor 2. The signal processor 2 transmits the first test signal A1 to the first speaker 3 and the second test signal A2 to the second speaker 4 again. The signal processor 2 simultaneously transmits the first reversed signal B11 to the second speaker 4 and the second reversed signal B21 to the first speaker 3, causing the second speaker 4 to receive the first crosstalk signal B1 and the first reversed signal B11 at the same time, and the first speaker 3 to receive the second crosstalk signal B2 and the second reversed signal B21 at the same time. The second speaker 4 simultaneously emits the first crosstalk sound and the first reversed phase sound, and the first speaker 3 simultaneously emits the second crosstalk sound and the second reversed phase sound. The first reversed phase sound eliminates the first crosstalk sound, and the second reversed phase sound eliminates the second crosstalk sound so as to reduce the crosstalk interference between the first speaker 3 and the second speaker 4, and thereby the first speaker 3 and the second speaker 4 output the audio with low signal interference to improve the effect of the stereo sound.

Figure 8:
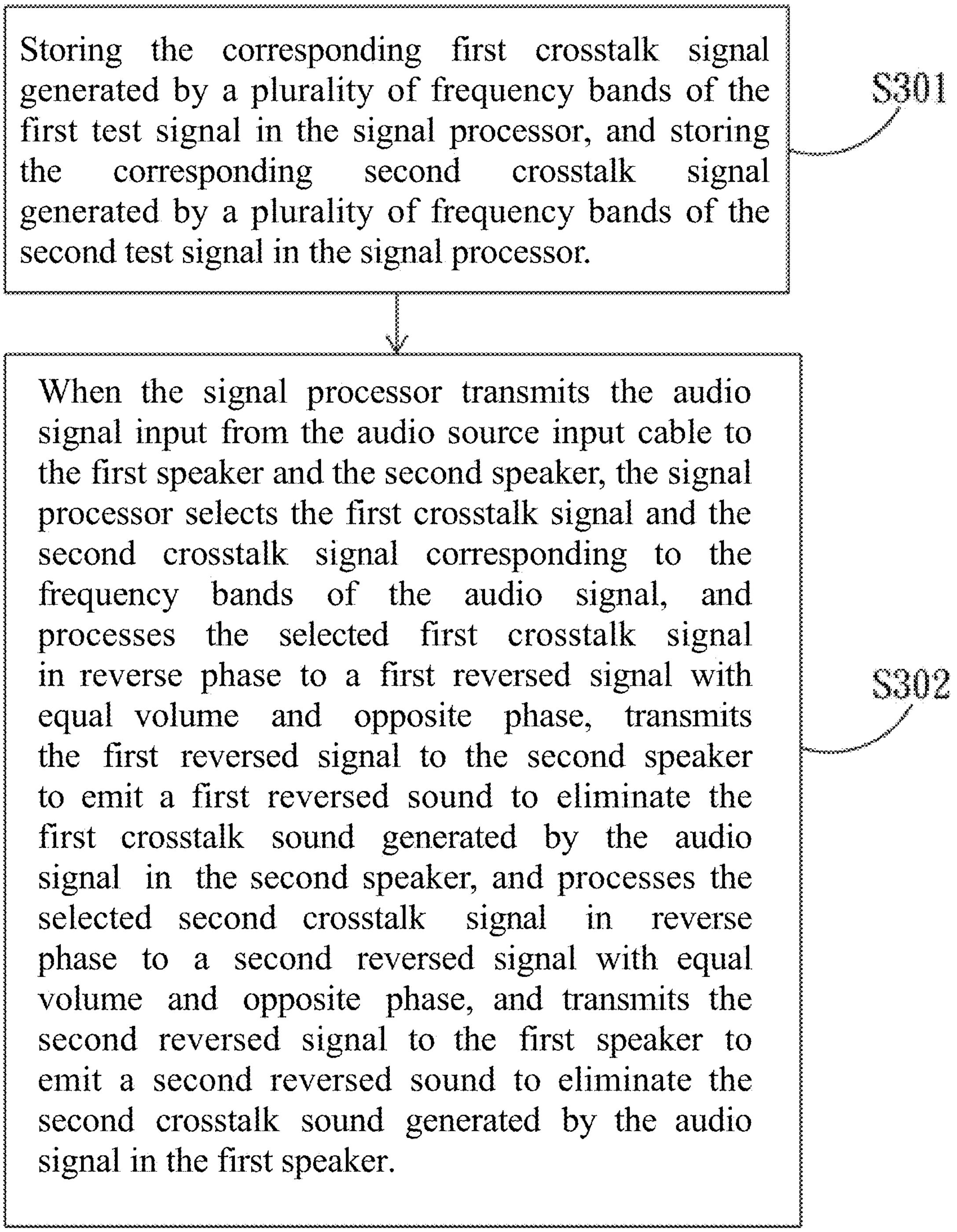
FIG. 8 is a step-by-step flowchart of the crosstalk elimination method for playing audio in the present application.

Please refer to FIG. 8, which is a step-by-step flowchart of the crosstalk elimination method for playing audio in the present application. As shown in the figures, the crosstalk elimination method of this embodiment further includes the steps S301 and S302. When the step S301 is executed, the corresponding first crosstalk signal B1 generated by a plurality of frequency bands of the first test signal A1 is stored in the signal processor 2, and the corresponding second crosstalk signal B2 generated by a plurality of frequency bands of the second test signal A2 is stored in the signal processor 2. In this embodiment, the detection device 5 inputs the first sweep signal and the second sweep signal into the signal processor 2 via the audio source input cable 1 in which the first sweep signal includes a plurality of frequency bands of the first test signal A1, and the second sweep signal includes a plurality of frequency bands of the second test signal A2. Therefore, the detection device 5 can detect the generated plurality of frequency bands of the first crosstalk signal B1 corresponding to the second speaker 4 and the generated plurality of frequency bands of the second crosstalk signal B2 corresponding to the first speaker 3, and store the detected plurality of frequency bands of the first crosstalk signal B1 and plurality of frequency bands of the second crosstalk signal B2 in the memory of the signal processor 2.

When the step S302 is executed, under the condition that the signal processor 2 transmits the audio signal input from the audio source input cable 1 to the first speaker 3 and the second speaker 4. The signal processor 2 selects the first crosstalk signal B1 and the second crosstalk signal B2 corresponding to the frequency bands of the audio signal, and processes the selected first crosstalk signal B1 in reverse phase to B11 with equal volume and opposite phase, transmits the first reversed signal B11 to the second speaker 4 to emit a first reversed phase sound to eliminate the first crosstalk sound generated by the audio signal in the second speaker 4, and processes the selected second crosstalk signal B2 in reverse phase to second reversed signal B21 with equal volume and opposite phase, transmits the second reversed signal B21 to the first speaker 3 to emit a second reversed phase sound to eliminate the second crosstalk sound generated by the audio signal in the first speaker 3. Therefore, When the crosstalk elimination playback system 100 plays any audio signal, the playback system 100 can acquire the first crosstalk signal B1 and the second crosstalk signal B2 corresponding to the frequency band of the audio signal through the memory of the signal processor 2 and let the second speaker play the first reversed signal B11 with equal volume and opposite phase to the first crosstalk signal B1 and let the first speaker 3 play the second reversed signal B21 with equal volume and opposite phase to the second crosstalk signal B2. The crosstalk interference between the first speaker 3 and the second speaker 4 is reduced in the playback system 100 so that the first speaker 3 and the second speaker 4 output the audio with low signal interference to improve the effect of stereo sound.

The crosstalk elimination method of this embodiment stores the first reversed signal B11 and the second reversed signal B21 of plurality of frequency bands as reference signals in the signal processor 2. The signal processor 2 selects the first crosstalk signal B1 and the second crosstalk signal B2 corresponding to the frequency band of audio signal in the memory, and processes the first crosstalk signal B1 and the second crosstalk signal B2 in reverse phase to the first reversed signal B11 and the second reversed signal B21 both having equal volume and opposite phase, respectively. The first reversed signal B11 and the first crosstalk signal B12 are set as reference signals of elimination. The audio signal is output in the first speaker 3 and the second speaker 4, and the first reversed signal B11 is transmitted to the second speaker 4 and the second reversed signal B21 is transmitted to the first speaker 3 to reduce crosstalk interference between the first speaker 3 and the second speaker 4 so that the first speaker 3 and the second speaker 4 output the audio with low signal interference to improve the effect of stereo sound.

Figure 9:
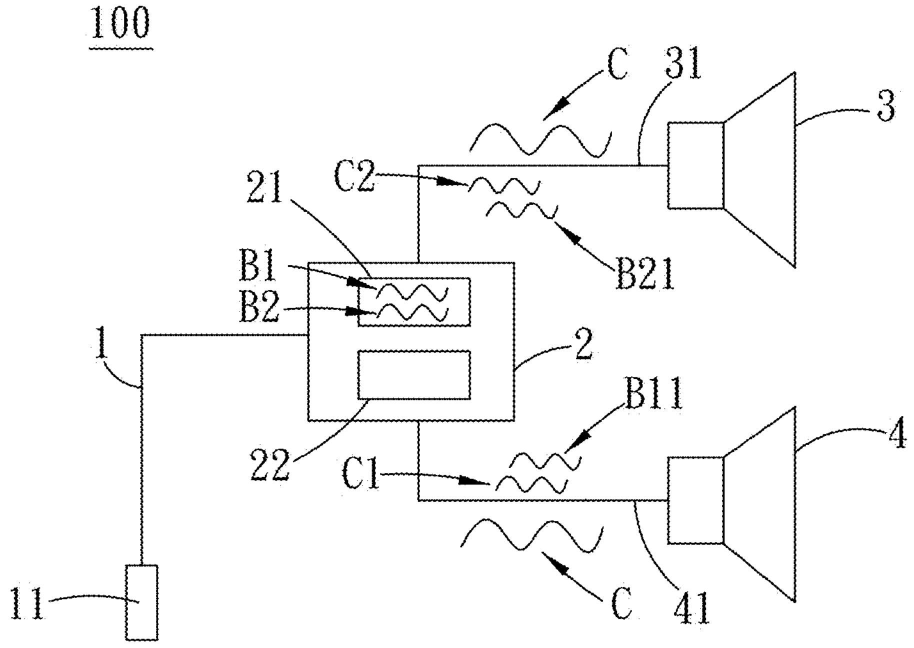
FIG. 9 is a schematic diagram of the crosstalk elimination playback system of the present application.

Please refer to FIG. 9, where FIG. 9 is a schematic diagram of the crosstalk elimination playback system of the present application. As shown in the figure, a crosstalk elimination playback system 100 includes an audio source input cable 1, a signal processor, a first speaker 3 and a second speaker 4. One terminal of the audio source input cable 1 is used for inputting an audio signal C. In this embodiment, an audio plug 11 is installed at one terminal of the audio source input cable 1, the audio source input cable 1 is connected to an audio output device (not shown) via the audio plug 11, the audio output device can be for example, a mobile phone, a computer, etc., and the audio output device transmits the audio signal C to the audio source input cable 1 via the audio plug 11. In addition, the signal processor 2 includes a storage module 21 and an inverted module 22, the storage module 21 is connected to the inversion module 22, the storage module 21 is used to store a first crosstalk signal B1 of a plurality of frequency bands and a second crosstalk signal B2 of a plurality of frequency bands, the inversion module 22 can be used to process the first crosstalk signal B1 of a plurality of frequency bands to a first inverted signal B11 of a plurality of frequency bands, and the inversion module 22 can be used to process the second crosstalk signal B2 of a plurality of frequency bands to a first inverted signal B21 of a plurality of frequency bands. The storage module 21 is the memory of the signal processor 2, and the inversion module 22 is an inverter. In this embodiment, the signal processor 2 is a digital signal processor (DSP). The first crosstalk signal B1 of a plurality of frequency bands and the second crosstalk signal B2 of a plurality of frequency bands are results of the play signals of the first speaker 3 and the second speaker 4 detected by the detection device. The above detection method is the same as the crosstalk elimination playback systems of the first embodiment in FIG. 6 and the second embodiment in FIG. 7, and is not further elaborated here.

Please refer to FIG. 9 again, the first speaker 3 and the second speaker 4 are electrically connected to the signal processor 2, respectively. The first speaker 3 and the second speaker 4 can be a speaker or an amplifier to output the signal to generate audio. The first speaker 3 is connected to the signal processor 2 via the first audio source input cable 31, and the second speaker 4 is connected to the signal processor 2 via the second audio source input cable 41.

When using the crosstalk elimination playback system 100 in this embodiment, an audio source input cable 1 has one terminal with an audio plug 11 is inserted to an audio output device, and the audio output device outputs the audio signal C to the first speaker 3 and the second speaker 4 through the audio source input cable 1 and the signal processor 2 in sequence. The signal processor 2 can transmit the audio signal C input from the audio source input cable 1 to the first speaker 3 via the first audio source input cable 31 and to the second speaker 4 via the second audio source input cable 41. The audio signal C generates a first crosstalk sound signal C1 in the second speaker 4, the audio signal C generates a second crosstalk sound signal C2 in the first speaker 3, the signal processor 2 selects a first crosstalk signal B1 corresponding to the frequency band of the first crosstalk sound signal C1 and a second crosstalk signal B2 corresponding to the frequency band of the second crosstalk sound signal C2 in a storage module 21, and an inverted module 22 processes the first crosstalk signal B1 and the second crosstalk signal B2 to a first inverted signal B11 and a second reversed signal B21 both with equal volume and opposite phase. The signal processor 2 transmits the first reversed signal B11 to the second speaker 4 to emit a first reversed phase sound and transmits the second reversed signal B21 to the first speaker 3 to emit a second reversed phase sound. The first reversed phase sound is used to eliminate a first crosstalk sound generated by the first crosstalk sound signal C1 in the second speaker 4 due to the audio signal C in the first speaker 3. The second reversed phase sound is used to eliminate a second crosstalk sound generated by the second crosstalk sound signal C2 in the first speaker 3 due to the audio signal C in the second speaker 4. Therefore, the crosstalk interference between the first speaker 3 and the second speaker 4 is reduced so that the first speaker 3 and the second speaker 4 output the audio with low signal interference to improve the effect of stereo sound.

Figure 10:
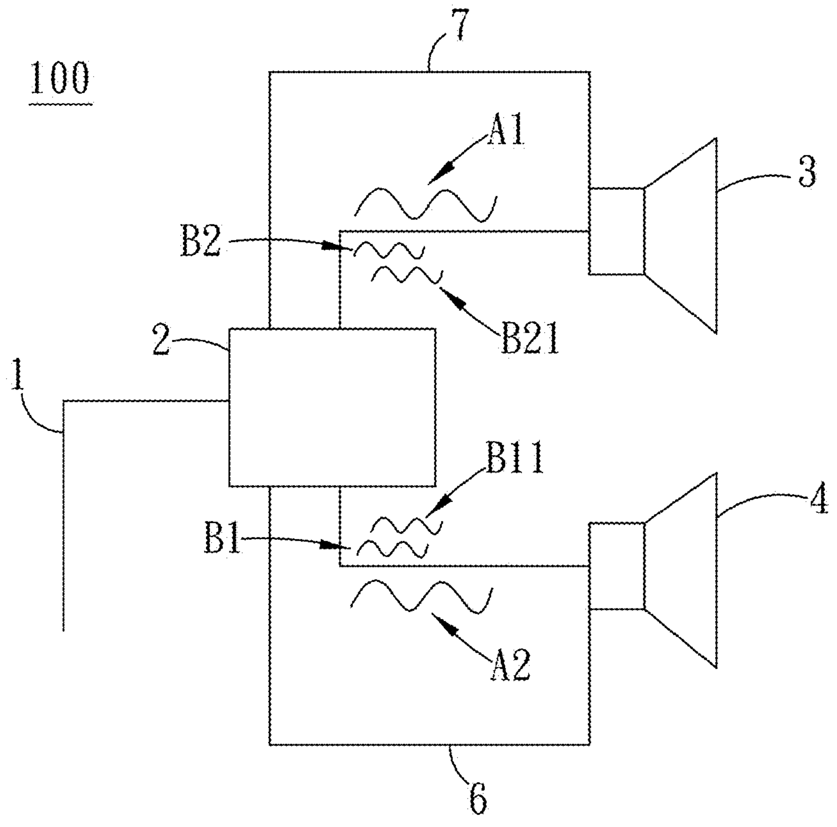
FIG. 10 is a schematic diagram of the crosstalk elimination playback system for the third embodiment of the present application.

Please refer to FIG. 10, which is a schematic diagram of the crosstalk elimination playback system for the third embodiment of the present application. As shown in the figure, a second speaker 4 is electrically connected to a signal processor 2 via a second signal feedback line 6, the signal processor 2 detects a first crosstalk signal B1, a first speaker 3 is electrically connected to the signal processor 2 via a first signal feedback line 7, and the signal processor 2 detects a second crosstalk signal B2. So, through the feedback mechanism of the signal processor 2, the first crosstalk signal B1 and the second crosstalk signal B2 of the second speaker 4 and the first speaker 3 respectively are detected in real-time.

When the crosstalk elimination playback system 100 of the present embodiment executes the step S101 and the step S201, the first test signal A1 and the second test signal A2 are input to enter the signal processor 2 via the audio source input cable 1. When the step S102 and the step S202 are executed, under the condition that the signal processor 2 transmits the first test signal A1 to the first speaker 3, the first test signal A1 results in the first crosstalk signal B1 generated by the second speaker 4, and the signal processor 2 detects the first crosstalk signal B1 via the second signal feedback line 6. Under the condition that the signal processor 2 transmits the second test signal A2 to the second speaker 4, the second test signal A2 results in the second crosstalk signal B2 generated by the first speaker 3, and the signal processor 2 detects the second crosstalk signal B2 via the first signal feedback line 7.

As the abovementioned, when the step S103 and the step S203 are executed, the signal processor 2 processes the detected first crosstalk signal B1 in reverse phase to the first reversed signal B11 with equal volume and opposite phase, and processes the detected second crosstalk signal B2 in reverse phase to the second reversed signal B21 with equal volume and opposite phase. When the step S104 and the step S204 are executed, the signal processor 2 transmits the first test signal A1 to the first speaker 3 and transmits the second test signal A2 to the second speaker 4, and simultaneously the signal processor 2 transmits the first reversed signal B11 to the second speaker 4 and transmits the second reversed signal B21 to the first speaker 3 so that the second speaker 4 receives the first crosstalk signal B1 and the first reversed signal B11 and the first speaker 3 receives the second crosstalk signal B2 and the second reversed signal B21. The second speaker 4 emits the first crosstalk sound and the first reversed phase sound, and the first speaker 3 emits the second crosstalk sound and the second reversed phase sound. The first reversed phase sound eliminates the first crosstalk sound, and the second reversed phase sound eliminates the second crosstalk sound.

The crosstalk elimination playback system 100 of this embodiment utilizes the signal processor 2 to transmits the first test signal A1 and the second test signal A2 to the first speaker 3 and the second speaker 4, and the detected B1 and B2 are transmitted to the signal processor 2 via the second signal feedback line 6 and the first signal feedback line 7 to form a feedback mechanism. The signal processor 2 processes the first crosstalk signal B1 and the second crosstalk signal B2 in reverse phase to the first reversed signal B11 and the second reversed signal B21 both with equal volume and opposite phase, the first test signal A1 is output in the first speaker 3, the first reversed signal B11 is transmitted to the second speaker 4, the second test signal A2 is output in the second speaker 4, and the second reversed signal B21 is transmitted to the first speaker 3. The crosstalk interference between the first speaker 3 and the second speaker 4 can be reduced, causing the first speaker 3 and the second speaker 4 output the audio with low signal interference, and the crosstalk of the playback system 100 can be self-recalibrated to avoid deterioration of the stereo sound due to the aging of the playback system, and can also avoid the problem of deterioration of the crosstalk elimination effect.

Figure 11:
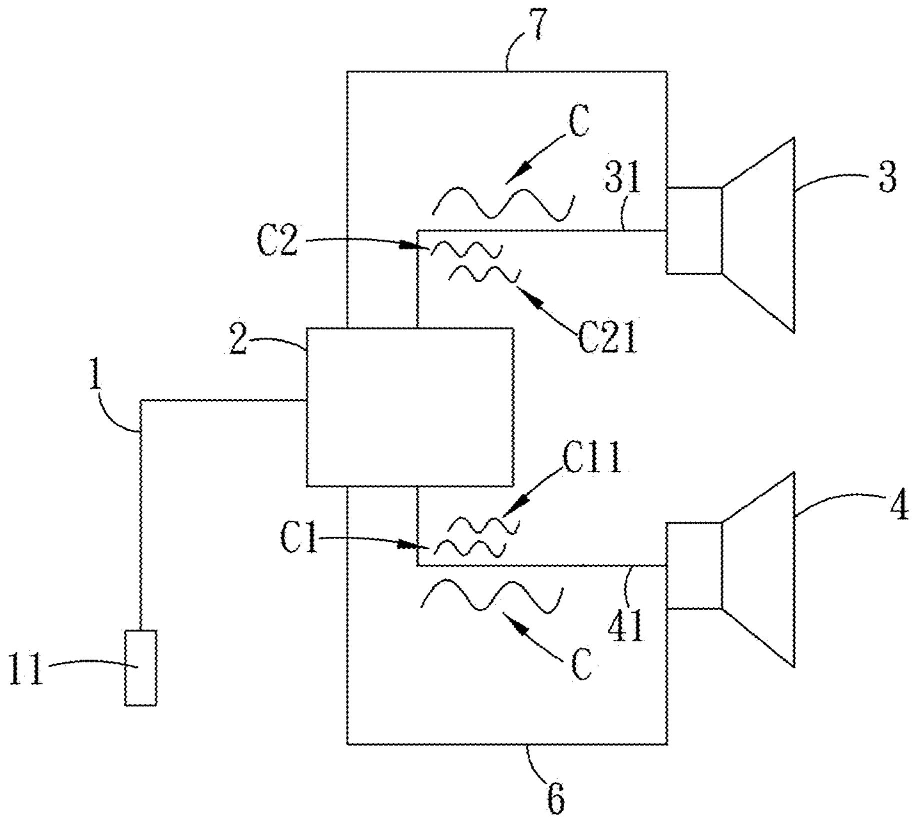
FIG. 11 is a schematic diagram of playing audio in the crosstalk elimination playback system for the third embodiment of the present application.

Please refer to FIG. 11, which is a schematic diagram of playing audio in the crosstalk elimination playback system for the third embodiment of the present application. As shown in the figure, the crosstalk elimination playback system 100 of the present embodiment includes an audio source input cable 1, a signal processor 2, a first speaker 3 and a second speaker 4. One terminal of the audio source input cable 1 is used to input an audio signal C. In the present embodiment, an audio plug 11 is provided at one terminal of the audio source input cable 1. The audio source input cable 1 is connected to an audio output device (not shown) through the audio plug 11. The audio output device can be, for example, a mobile phone, a computer, etc., and the audio output device inputs the audio signal C to the audio source input cable 1 via the audio plug 11. The signal processor 2 transmits the audio signal C input from the audio source input cable 1 to the first speaker 3 and the second speaker 4 via the first audio source input cable 31 and the second audio source input cable 41, respectively. The first speaker 3 and the second speaker 4 can be a speaker or an amplifier used for inputting signal to generate the audio. In the present embodiment, the signal processor 2 includes the first signal feedback line 7 and the second signal feedback line 6. The first signal feedback line 7 is electrically connected to the first speaker 3. The first signal feedback line 7 receives the second crosstalk sound signal C2 of the first speaker 3 and feedback it to the signal processor 2. The second signal feedback line 6 is electrically connected to the second speaker 4. The second signal feedback line 6 receives the first crosstalk sound signal C1 of the second speaker 4 and feedback it to the signal processor 2. Therefore, through the signal processor 2 and the first signal feedback line 7 and the second signal feedback line 6 form a feedback mechanism, the first crosstalk sound signal C1 and the second crosstalk sound signal C2 of the second speaker 4 and the first speaker 3 are detected in real time.

As the abovementioned, the signal processor 2 processes the first crosstalk sound signal C1 in reverse phase to the first audio inverted signal C11 with equal volume and opposite phase, the second speaker 4 outputs the first audio inverted signal C11 to generate a first audio reversed phase sound eliminating the first crosstalk sound. The signal processor 2 processes the second crosstalk sound signal C2 in reverse phase to the second audio inverted signal C21 with equal volume and opposite phase, the first speaker 3 outputs the second audio inverted signal C21 to generate a second audio reversed phase sound eliminating the second crosstalk sound. Therefore, in this embodiment, the detected B1 and B2 are transmitted to the signal processor 2 via the second signal feedback line 6 and the first signal feedback line 7, and are processed in reverse phase by the signal processor 2 to eliminate the detected B1 and B2 to form a feedback mechanism. Not only is the crosstalk interference between the first speaker 3 and the second speaker 4 reduced, causing the first speaker 3 and the second speaker 4 outputting the audio with low signal interference to improve the effect of stereo sound, but also is that the crosstalk of the playback system 100 can be self-recalibrated to avoid deterioration of the stereo sound due to the aging of the playback system realized, which can also avoid the problem of deterioration of the crosstalk elimination effect.

Figure 12:
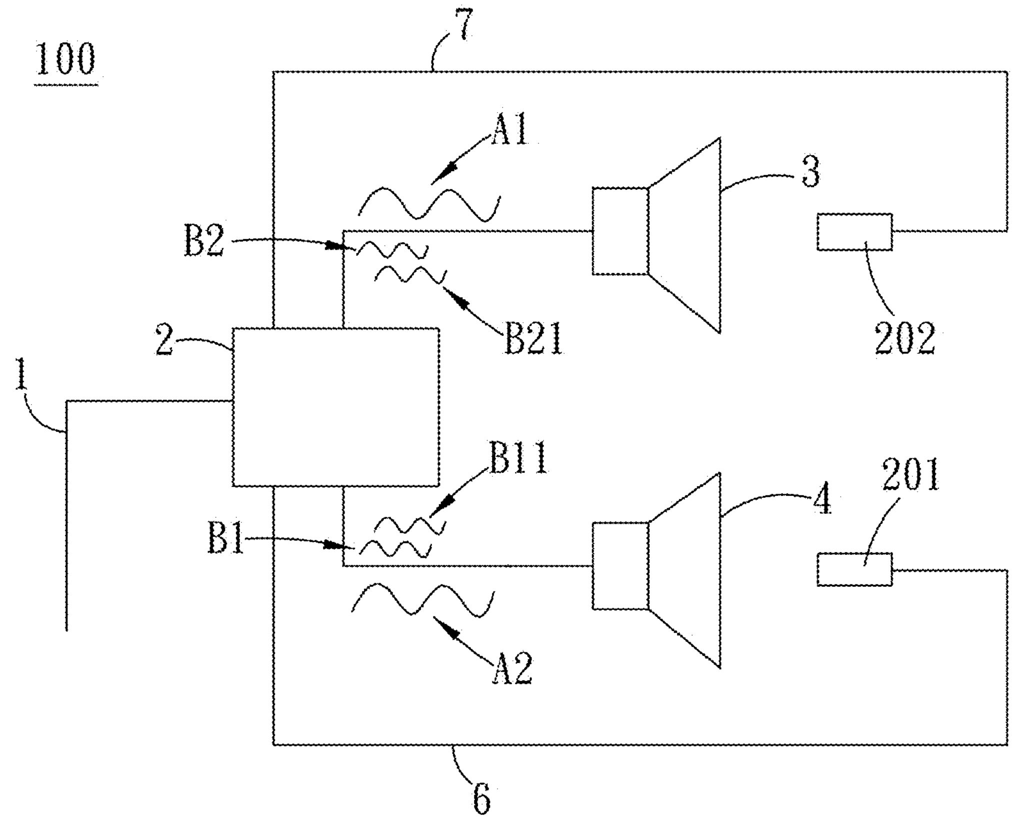
FIG. 12 is a schematic diagram of the crosstalk elimination playback system for the fourth embodiment of the present application.

Please refer to FIG. 12, which is a schematic diagram of the crosstalk elimination playback system for the fourth embodiment of the present application. As shown in the figure, a first sound receiver 201 corresponds to the second speaker 4, the first sound receiver 201 receives a first crosstalk sound and converts the first crosstalk sound to the first crosstalk signal B1, and transmits the first crosstalk signal B1 to the signal processor 2. A second sound receiver 202 corresponds to the first speaker 3, the second sound receiver 201 receives a second crosstalk sound and converts the second crosstalk sound to the second crosstalk signal B2, and transmits the second crosstalk signal B2 to the signal processor 2. In this embodiment, the first sound receiver 201 is electrically connected to the signal processor 2 via the second signal feedback line 6, and the second sound receiver 201 is electrically connected to the signal processor 2 via the first signal feedback line 7. The first sound receiver 201 and the second sound receiver 201 are microphones.

The difference between The crosstalk elimination playback system 100 of the present embodiment and the crosstalk elimination playback system of the third embodiment in FIG. 10 lies in When the crosstalk elimination playback system 100 of the present embodiment executes the step S102 and the step S202, the signal processor 2 receives the first crosstalk sound generated by the second speaker 4 via the first sound receiver 201 and converts the first crosstalk sound to the first crosstalk signal B1, and the signal processor 2 receives the second crosstalk sound generated by the first speaker 3 via the second sound receiver 201 and converts the second crosstalk sound to the second crosstalk signal B2. Continuously the step S103 and the step S203 are executed to process the abovementioned crosstalk signals in reverse phase to inverted signals. Finally, the step S104 and the step S204 are executed, and the reversed phase sound of the inverted signal reduces or eliminates the original crosstalk. In the above mentions, except the step S102 and the step S202 through the first sound receiver 201 and the second sound receiver 201, which is different from the method of the third embodiment, the other steps are the same as those in the crosstalk elimination playback system of the third embodiment, and are not further elaborated here.

Figure 13:
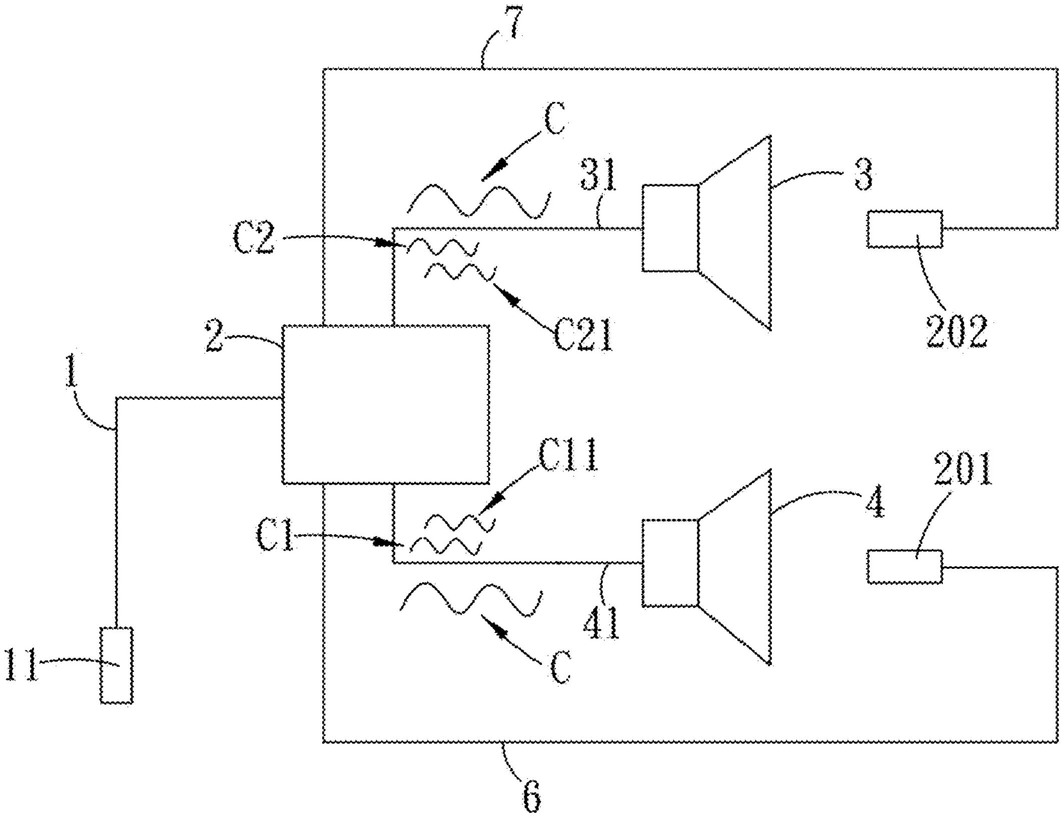
FIG. 13 is a schematic diagram of playing audio in the crosstalk elimination playback system for the fourth embodiment of the present application.

Please also refer to FIG. 13, which is a schematic diagram of playing audio in the crosstalk elimination playback system for the fourth embodiment of the present application. As shown in the figure, in this embodiment, the signal processor 2 includes the first sound receiver 201 and the second sound receiver 201. The signal processor 2 and the first sound receiver 201 are connected via the first signal feedback line 7. The signal processor 2 and the second sound receiver 201 are connected via the second signal feedback line 6. The first sound receiver 201 corresponds to the second speaker 4, and the first sound receiver 201 receives the first crosstalk sound in the second speaker 4. The first sound receiver 201 converts the first crosstalk sound to the first crosstalk sound signal C1. The second sound receiver 201 corresponds to the first speaker 3, and the second sound receiver 201 receives the second crosstalk sound in the first speaker 3. The second sound receiver 201 converts the second crosstalk sound to the second crosstalk sound signal C2. In this embodiment, the first sound receiver 201 and the second sound receiver 201 can use the microphone, or the other electronic components which can receive sound wave and convert to sound signal, analog-to-digital converters, filters, and audio processors.

The difference between The crosstalk elimination playback system 100 of the present embodiment and the crosstalk elimination playback system of the third embodiment in FIG. 11 lies in The crosstalk elimination playback system 100 of the present embodiment receives the first crosstalk sound of the second speaker 4 via the first sound receiver 201 and converts the first crosstalk sound to the first crosstalk sound signal C1, and receives the second crosstalk sound of the first speaker 3 via the second sound receiver 201 and converts the second crosstalk sound to the second crosstalk sound signal C2. The method for eliminating the first crosstalk sound and the second crosstalk sound is the same as the crosstalk elimination playback system of the third embodiment in FIG. 11, and are not further elaborated here.

As the above mentions, the present application provides a crosstalk elimination method and a crosstalk elimination playback system. Under the condition of playing the first test signal via the first speaker, the first crosstalk signal generated by the second speaker resulting from the first test signal is detected. When the first speaker plays the first test signal again, the second speaker plays the first reversed signal with equal volume and opposite phase to the first crosstalk signal. Through the first reversed phase sound emitted from the second speaker and eliminating the first crosstalk sound, the interference caused by the first crosstalk sound generated by the first test signal played by the first speaker to the second speaker can be reduced. Thereby the second speaker outputs the audio with low signal interference to improve the effect of stereo sound.

In the present application, the first crosstalk signal and the second crosstalk signal of a plurality of frequency bands are stored in the signal processor. The signal processor can select the corresponding first crosstalk signal and the second crosstalk signal according to the frequency band of the audio signal. When the first speaker and the second speaker output the audio signal, the second speaker simultaneously outputs the first reversed signal with equal volume and opposite phase to the first crosstalk signal, and the first speaker simultaneously outputs the second reversed signal with equal volume and opposite phase to the second crosstalk signal. Thus, the mutual interference due to the output audio signal in the first speaker and the second speaker can be reduced, causing the playback system output the audio with low signal to improve the effect of stereo sound.

Through the feedback mechanism of the signal processor in the present application, the first crosstalk sound signal and the second crosstalk sound signal generated by playing audio signal in the first speaker and the second speaker, are detected. When the first speaker and the second speaker output the audio signal, the second speaker simultaneously outputs the first audio inverted signal with equal volume and opposite phase to the first crosstalk sound signal, and the first speaker simultaneously outputs the second audio inverted signal with equal volume and opposite phase to the second crosstalk sound signal. Thus, the crosstalk interference between the first speaker and the second speaker is reduced, causing the first speaker and the second speaker output the audio with low interference to improve the effect of stereo sound. It can also achieve the self-correction of crosstalk in the playback system to avoid deterioration of stereo sound caused by the aging of the playback system, and prevent the degradation of crosstalk elimination effects.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A crosstalk elimination method for a playback system comprising an audio source input cable, a signal processor, a first speaker and a second speaker, wherein the audio source input cable is connected to the signal processor, the signal processor is connected to the first speaker by a first wire and connected to the second speaker by a second wire, and the first wire and the second wire are connected in parallel, the method comprising steps of:

inputting a first test signal into the signal processor via the audio source input cable;

detecting a first crosstalk signal generated by the second speaker and caused by the first test signal when the signal processor transmitting the first test signal to the first speaker;

reversing the detected first crosstalk signal to a first reversed signal having equal volume and opposite phase, wherein when the signal processor transmits the first test signal to the first speaker again, the second speaker receives the first crosstalk signal and emits a first crosstalk sound, the first reversed signal is transmitted to the second speaker to emit a first reversed phase sound, and the first reversed phase sound eliminates the first crosstalk sound;

wherein the second speaker is electrically connected to the signal processor via a second signal feedback line, the signal processor detects the first crosstalk signal, the first speaker is electrically connected to the signal processor via a first signal feedback line, and the signal processor detects the second crosstalk signal.

2. The crosstalk elimination method as claimed in claim 1, further comprising the steps of:

inputting a second test signal into the signal processor via the audio source input cable;

detecting a second crosstalk signal generated by the first speaker and caused by the second test signal when the signal processor transmitting the second test signal to the second speaker;

reversing the detected second crosstalk signal to a second reversed signal having equal volume and opposite phase, wherein when the signal processor transmits the second test signal to the second speaker again, the first speaker receives the second crosstalk signal and emits a second crosstalk sound, the second reversed signal is transmitted to the first speaker to emit a second reversed phase sound, and the second reversed phase sound eliminates the second crosstalk sound.

3. The crosstalk elimination method as claimed in claim 2, in the steps of detecting the first crosstalk signal generated by the second speaker and caused by the first test signal and detecting the second crosstalk signal generated by the first speaker and caused by the second test signal, the steps further comprising:

using a detection device electrically connected to the second speaker, wherein the detection device detects the first crosstalk signal, and the first crosstalk signal is stored in the signal processor; and using the detection device electrically connected to the first speaker, wherein the detection device detects the second crosstalk signal, and the second crosstalk signal is stored in the signal processor.

4. The crosstalk elimination method as claimed in claim 2, in the steps of detecting the first crosstalk signal generated by the second speaker and caused by the first test signal and detecting the second crosstalk signal generated by the first speaker and caused by the second test signal, the steps further comprising:

using a first sound receiver of a detection device corresponding to the second speaker for receiving the first crosstalk sound, wherein the first crosstalk sound is converted to the first crosstalk signal, and the first crosstalk signal is stored in the signal processor;

using a second sound receiver of the detection device corresponding to the first speaker for receiving the second crosstalk sound, wherein the second crosstalk sound is converted to the second crosstalk signal, and the second crosstalk signal is stored in the signal processor.

5. The crosstalk elimination method as claimed in claim 2, in the steps of detecting the first crosstalk signal generated by the second speaker and caused by the first test signal and detecting the second crosstalk signal generated by the first speaker and caused by the second test signal, further comprising:

using a first sound receiver corresponding to the second speaker, wherein the first sound receiver receives the first crosstalk sound, converts the first crosstalk sound to the first crosstalk signal, and transmits the first crosstalk signal to the signal processor; and using a second sound receiver corresponding to the first speaker, wherein the second sound receiver receives the second crosstalk sound, converts the second crosstalk sound to the second crosstalk signal, and transmits the second crosstalk signal to the signal processor.

6. The crosstalk elimination method as claimed in claim 2, further comprising the steps of:

storing the first crosstalk signal in the signal processor, wherein the first crosstalk signal is caused by the first test signal with a plurality of frequency bands; and storing the second crosstalk signal in the signal processor, wherein the second crosstalk signal is caused by the second test signal with a plurality of frequency bands;

when the signal processor transmitting an audio signal input to the first speaker and the second speaker via the audio source input cable, the signal processor selecting the first crosstalk signal and the second crosstalk signal corresponding to the frequency band of the audio signal;

reversing the selected first crosstalk signal to the first reversed signal having equal volume and opposite phase;

transmitting the first reversed signal to the second speaker to emit the first reversed phase sound for eliminating a first crosstalk sound caused by the audio signal in the second speaker; and transmitting the second reversed signal to the first speaker to emit the second reversed phase sound for eliminating a second crosstalk sound caused by the audio signal in the second speaker.

7. A crosstalk elimination playback system, comprising:

an audio source input cable having two terminals in which one used for inputting an audio signal;

a signal processor electrically connected to the other terminal of the audio source input cable, wherein the signal processor stores a first crosstalk signal and a second crosstalk signal with a plurality of frequency bands;

a first speaker electrically connected to the signal processor by a first wire;

a second speaker electrically connected to the signal processor by a second wire, wherein the first wire and the second wire are connected in parallel, wherein when the first speaker and the second speaker output the audio signal, a first crosstalk sound and a second crosstalk sound are respectively generated which are caused by the audio signal in the second speaker and the first speaker, the signal processor selects the first crosstalk signal and the second crosstalk signal corresponding to the frequency band of the first crosstalk sound and the second crosstalk sound, the first crosstalk signal and the second crosstalk signal are reversed to a first reversed signal and a second reversed signal both having equal volume and opposite phase respectively, the second speaker outputs the first reversed signal to a first reversed phase sound for eliminating the first crosstalk sound, and the first speaker outputs the second reversed signal to a second reversed phase sound for eliminating the second crosstalk sound.

8. The crosstalk elimination playback system as claimed in claim 7, further comprising a detection device, wherein the first speaker outputs a first test signal, the detection device detects the first crosstalk signal emitted by the second speaker, the first crosstalk signal is stored in the signal processor, the second speaker outputs a second test signal, the detection device detects the second crosstalk signal emitted by the first speaker, and the second crosstalk signal is stored in the signal processor.

9. The crosstalk elimination playback system as claimed in claim 7, further comprising a detection device comprising a first sound receiver and a second sound receiver, wherein the first speaker outputs a first test signal, the first sound receiver corresponds to the second speaker, the first sound receiver receives the first crosstalk sound of the second speaker, the first sound receiver converts the first crosstalk sound to the first crosstalk signal, the second speaker outputs a second test signal, the second sound receiver corresponds to the first speaker, the second sound receiver receives the second crosstalk sound of the first speaker, and the second sound receiver converts the second crosstalk sound to the second crosstalk signal.

10. The crosstalk elimination playback system as claimed in claim 7, wherein the signal processor comprises a storage module and an inversion module connected to the storage module, the storage module stores the first and the second crosstalk signals, the inversion module reverses the first crosstalk signal to the first reversed signal, and the inversion module reverses the second crosstalk signal to the second reversed signal.

11. A crosstalk elimination playback system, comprising:

an audio source input cable having two terminals in which one used for inputting an audio signal;

a signal processor electrically connected to the other terminal of the audio source input cable;

a first speaker electrically connected to the signal processor by a first wire;

a second speaker electrically connected to the signal processor by a second wire, wherein the first wire and the second wire are connected in parallel, wherein when the first speaker and the second speaker output the audio signal, and the audio signal causes the second speaker to generate the first crosstalk sound signal and the first speaker to generate the second crosstalk sound signal, the first crosstalk sound signal is output to the first crosstalk sound via the second speaker, the second crosstalk sound signal is output to the second crosstalk sound via the first speaker, the signal processor detects the first and second speakers respectively, the signal processor reverses the first crosstalk sound signal to a first audio reversed signal having equal volume and opposite phase, the second speaker outputs the first audio reversed signal to a first audio reversed phase sound, the first audio reversed phase sound eliminates the first crosstalk sound, the signal processor reverses the second crosstalk sound signal to a second audio reversed signal having equal volume and opposite phase, the first speaker outputs the second audio reversed signal to a second audio reversed phase sound, and the second audio reversed phase sound eliminates the second crosstalk sound;

wherein the processor comprises a first signal feedback line and a second signal feedback line, the first signal feedback line is electrically connected to the first speaker, the first signal feedback line receives the second crosstalk sound signal from the first speaker, the second signal feedback line is electrically connected to the second speaker, and the second signal feedback line receives the first crosstalk sound signal from the second speaker.

12. The crosstalk elimination playback system as claimed in claim 11, wherein the signal processor includes a first sound receiver and a second sound receiver, the first sound receiver is corresponding to the second speaker, the first sound receiver receives the first crosstalk sound from the second speaker, the first sound receiver converts the first crosstalk sound to the first crosstalk sound signal, the second sound receiver is corresponding to the first speaker, the second sound receiver receives the second crosstalk sound from the first speaker, and the second sound receiver converts the second crosstalk sound to the second crosstalk sound signal.

13. The crosstalk elimination method as claimed in claim 1, wherein the method comprising steps of: detecting the first crosstalk signal on the second wire generated by the second speaker and caused by the first test signal when the signal processor transmitting the first test signal to the first speaker.

14. The crosstalk elimination method as claimed in claim 2, wherein the method comprising steps of: detecting the second crosstalk signal on the first wire generated by the first speaker and caused by the second test signal when the signal processor transmitting the second test signal to the second speaker.

15. The crosstalk elimination playback system as claimed in claim 11, wherein the first crosstalk sound signal and the second crosstalk sound signal are separately detected by a feedback mechanism through the signal processor.

* * * * *